(12) United States Patent
Ross

(10) Patent No.: US 7,462,840 B2
(45) Date of Patent: Dec. 9, 2008

(54) SECURE TAG READER

(75) Inventor: Gary A. Ross, Edinburgh (GB)

(73) Assignee: NCR Corporation, Dayton, OH (US)

( * ) Notice: Subject to any disclaimer, the term of this patent is extended or adjusted under 35 U.S.C. 154(b) by 266 days.

(21) Appl. No.: 11/274,968

(22) Filed: Nov. 16, 2005

(65) Prior Publication Data

US 2007/0108392 A1    May 17, 2007

(51) Int. Cl.
F21V 9/16    (2006.01)
(52) U.S. Cl. .................................. 250/458.1
(58) Field of Classification Search ............. 250/458.1
See application file for complete search history.

(56) References Cited

U.S. PATENT DOCUMENTS

| | | | | |
|---|---|---|---|---|
| 3,663,813 A | * | 5/1972 | Shaw | 250/271 |
| 4,047,033 A | * | 9/1977 | Malmberg et al. | 250/341.1 |
| 4,442,170 A | * | 4/1984 | Kaule et al. | 428/333 |
| 5,502,304 A | * | 3/1996 | Berson et al. | 250/271 |
| 6,473,165 B1 | * | 10/2002 | Coombs et al. | 356/71 |
| 7,256,398 B2 | * | 8/2007 | Ross et al. | 250/302 |
| 7,262,420 B1 | * | 8/2007 | MacLeod et al. | 250/458.1 |
| 2004/0031931 A1 | * | 2/2004 | Muller et al. | 250/458.1 |
| 2004/0145726 A1 | | 7/2004 | Csulits et al. | |
| 2006/0180792 A1 | * | 8/2006 | Ricci et al. | 252/301.16 |
| 2007/0108392 A1 | * | 5/2007 | Ross | 250/458.1 |

FOREIGN PATENT DOCUMENTS

| | | |
|---|---|---|
| EP | 1 117 060 A | 7/2001 |
| EP | 1 244 073 A2 | 9/2002 |
| GB | 2 355 522 A | 4/2001 |
| WO | WO 2005/106434 A | 11/2005 |

OTHER PUBLICATIONS

Dejneka, et al; "Rare earth-doped glass microbarcodes" Proceedings of the National Academy of Sciences of USA, National Academy of Science, Washington, DC, US, vol. 100, No. 2, Jan. 21, 2003, pp. 389-393, XP002323047 ISSN:0027-8424 the whole document.

* cited by examiner

*Primary Examiner*—Christine Sung
(74) *Attorney, Agent, or Firm*—Christopher P. Ricci; Charles Q. Maney

(57) ABSTRACT

A reader for a secure tag. The reader comprises a first excitation source (such as one or more LEDs) that stimulates at least one transition in the secure tag. The reader also comprises a second excitation source that stimulates more transitions than were stimulated by the first excitation source. The reader has a detector for detecting luminescence from the secure tag in response to excitation from the first excitation source and in response to excitation from the second excitation source to ensure that luminescence is detected at a predetermined wavelength in response to the second excitation source but not the first excitation source.

10 Claims, 4 Drawing Sheets

Fig 3
| Excitation (nm) | Luminescence (nm) |
|---|---|
| 395 | 535 |
| | 590.5 |
| | 615 |
| | 654 |
| 415 | 590.5 |
| | 615 |
| 465 | 590.5 |
| | 615 |
| 535 | 615 |
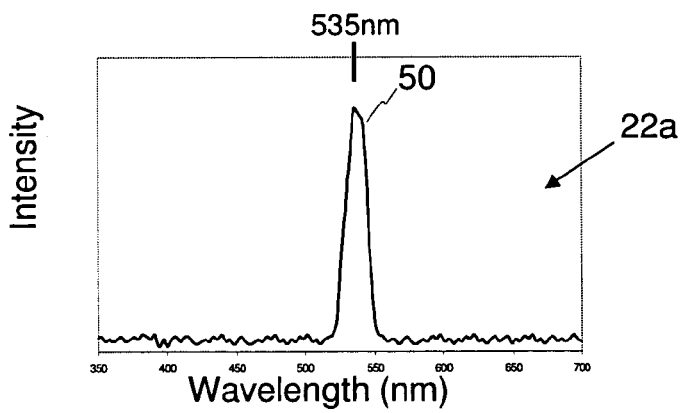
Fig 4
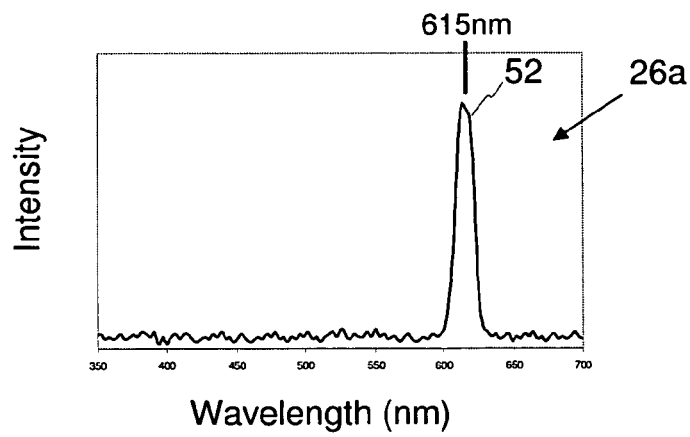
Fig 5

US 7,462,840 B2

SECURE TAG READER

BACKGROUND

The present invention relates to a secure tag reader.

Secure tags are used for a number of different purposes. One of the primary uses of a secure tag is to prevent counterfeiting. One type of secure tag that has recently been developed is based on small particles of a rare earth doped host, such as glass. This type of secure tag is described in U.S. patent application No. 2004/0262547, entitled "Security Labelling," and U.S. patent application No. 2005/0143249, entitled "Security Labels which are Difficult to Counterfeit", both of which are incorporated herein by reference. These rare earth doped particles (hereinafter "RE particles") can be applied to valuable items in different ways. For example, the secure tags can be incorporated in fluids which are applied (printed, sprayed, painted, or such like) to valuable items, or incorporated directly into the valuable items.

In response to suitable excitation, RE particles produce a luminescence spectrum having narrow peaks because of the atomic (rather than molecular) transitions involved. Known RE particle readers include (i) a suitable excitation source, and (ii) a detector to measure the luminescence emitted in response to excitation. The suitable excitation source may be tuned (in the sense that the excitation is selected to optimize luminescence from one or more transitions in the rare earth ions), or high frequency (to stimulate all transitions in the rare earth ions and the host).

Tuned excitation is usually achieved using a narrowband source, such as an LED, in the visible region of the electromagnetic spectrum. High frequency excitation may be achieved using a broadband source having a high intensity contribution from the ultra-violet or low-wavelength visible (for example, between 350 nm and 400 nm) portion of the electromagnetic spectrum. Alternatively, high frequency excitation may be achieved using a narrowband source emitting in the ultra-violet or low-wavelength visible portion (for example, at 395 nm) of the electromagnetic spectrum.

One disadvantage of the RE particles being responsive to excitation from a high frequency source is that it may be possible for a fraudster to simulate the behavior of the security tag using a counterfeit tag. The counterfeit tag may have a broadband luminescence that is suppressed (for example, filtered) so that only a narrowband response is detected.

SUMMARY

According to a first aspect of the invention there is provided a reader for a secure tag, the reader comprising a first excitation source that stimulates at least one transition; and a second excitation source that stimulates more transitions than the first excitation source; and a detector for detecting luminescence from the secure tag in response to excitation from the first excitation source and in response to excitation from the second excitation source to ensure that luminescence is detected at a pre-determined wavelength in response to the second excitation source but not the first excitation source.

By virtue of this aspect of the invention two excitation sources can be used, one at a time (or the first source on its own, and then the first and second source together), and the luminescence response resulting from each compared. This can be used to ensure that luminescence at the pre-determined wavelength is not being filtered or otherwise suppressed. If luminescence at the pre-determined wavelength is being suppressed, then excitation by the second excitation source will not result in luminescence at that wavelength.

The luminescence detected at the pre-determined wavelength in response to the second excitation source may be a transition that merges with another transition in a luminescence spectrum to give a broader peak than the peak detected in response to radiation from the first excitation source. This may be measured by the Full Width at Half Maximum (FWHM) of the peak.

The first and second excitation sources may have a common radiation supply that is filtered, tuned, or otherwise adapted to selectively provide the first excitation source at one time, and the second excitation source at another (different) time. Alternatively, the first and second excitation sources may be separate so that both can be activated simultaneously, if so desired.

The first excitation source may be selected so that it is tuned to a transition so that a strong luminescence signal is received at the tuned-transition wavelength. Alternatively, the first excitation source may be selected to stimulate luminescence using an Anti-Stokes shift phenomenon. Anti-Stokes shift means that two photons from the first excitation source are required to produce one photon of luminescence from the transition. Luminescence resulting from Anti-Stokes shift is much weaker than luminescence from excitation tuned to that transition.

It should be appreciated that a broadband source (such as a white light LED) may be used as the second excitation source. By definition, a broadband source excites at a range of wavelengths, some of which may be higher but others are lower than the wavelength of the first excitation source. Those wavelengths that are lower than the wavelength of the first excitation source are typically the wavelengths that stimulate transitions that were not stimulated by the first excitation source.

The reader may further comprise a processor for processing the detected luminescence to determine if an acceptance criterion is fulfilled.

The acceptance criterion may comprise a first set of luminescence values in response to excitation from the first excitation source, where the first set of luminescence values includes no luminescence being detected at the pre-determined wavelength; and a second set of luminescence values in response to excitation from the second excitation source, where the second set of luminescence values includes luminescence being detected at the pre-determined wavelength.

The first set of luminescence values may include no luminescence from one wavelength (first null wavelength) in addition to no luminescence being detected at the pre-determined wavelength.

The second set of luminescence values may include no luminescence from one wavelength (second null wavelength), where the second null wavelength may be the same as, or different to, the first null wavelength. Ensuring that the second set of luminescence values includes a wavelength at which no luminescence is measured may be useful to ensure that a broadband response is not being measured.

The reader may include a port for outputting luminescence information to a computer or other processing device. The port may be a universal serial bus (USB) port, a Firewire (trademark) port, or such like.

The secure tag may comprises dopant ions in a host, and the second excitation source may stimulate a plurality of transitions in both the dopant ions and the host; whereas, the first excitation source may stimulate one or more transitions in the dopant ions but not in the host.

The security tag may be an inorganic pigment. One suitable inorganic pigment is a rare earth doped particle. The rare earth doped particle may comprise a glass matrix, such as borosilicate glass, doped with one or more rare earth ions. A rare earth ("RE") doped glass particle is referred to herein as an "RE glass particle".

Other types of security tag may be used in addition to or instead of an RE glass particle. These luminescent security tags include organic pigments, dyes, and metal ions (such as lanthanides).

According to a second aspect of the present invention there is provided a reader for a secure tag, the reader comprising (i) a first excitation supply that stimulates at least one luminescence peak from the secure tag, and (ii) a second excitation supply that stimulates more luminescence peaks from the secure tag than the first excitation supply.

The first and second excitation supplies may be provided by a single broadband source (such as a white light LED) that is selectively filtered or tuned (for example, by a diffraction grating or by a prism) so that a first wavelength (or range of wavelengths) is emitted from the reader when tuned to the first supply, and a second wavelength (or range of wavelengths) is emitted from the reader when tuned to the second supply. Alternatively, the first and second excitation supplies may be implemented by a first and second excitation source, respectively.

According to a third aspect of the present invention there is provided a reader for a secure tag, the reader comprising a plurality of sequentially-energizable, excitation sources, such that a first one of the excitation sources stimulates at least one luminescence peak from the secure tag, and a second one of the excitation sources stimulates more luminescence peaks from the secure tag than the first one of the excitation sources.

According to a fourth aspect of the invention there is provided a method of authenticating a secure tag comprising: exciting the secure tag at a first wavelength to stimulate a plurality of transitions; detecting luminescence from the secure tag in response to the first wavelength excitation; exciting the secure tag at a second wavelength, lower than the first wavelength, to stimulate more transitions than for the excitation at the first excitation; detecting luminescence from the secure tag in response to the second wavelength excitation; comparing luminescence at a pre-determined wavelength resulting from the first wavelength excitation with luminescence at the pre-determined wavelength resulting from the second wavelength excitation; authenticating the secure tag in the event that the second wavelength excitation stimulates luminescence at the pre-determined wavelength and the first wavelength excitation does not stimulate luminescence at the pre-determined wavelength.

According to a fifth aspect of the invention there is provided a method of authenticating a secure tag, the method comprising: (i) exciting the secure tag with radiation having a wavelength less than 450 nm; (ii) measuring luminescence emitted from the secure tag at a first wavelength, which is below 550 nm; (iii) verifying that the measured luminescence at the first wavelength is lower than a pre-determined value; (iv) exciting the secure tag with radiation having a wavelength greater than or equal to 450 nm; (v) measuring luminescence emitted from the secure tag in response to the excitation by radiation at a wavelength above or equal to 450 nm; (vi) verifying that the luminescence measured in step (v) matches a pre-determined luminescence signature for the secure tag; (vi) authenticating the secure tag when the luminescence measured in step (v) matches the pre-determined luminescence signature.

The method may include the further step of authenticating the secure tag only when the luminescence measured in step (v) matches the pre-determined luminescence signature and the luminescence measured in step (ii) includes a peak.

It will be appreciated by those of skill in the art that there is a background noise level for any luminescence measurements, so when reference is made to "luminescence not being stimulated", or reference is made to "no luminescence", or similar, these statements mean that any luminescence measured is not appreciably higher than a background noise level.

These and other aspects of the present invention will be apparent from the following specific description, given by way of example, with reference to the following drawings.

BRIEF DESCRIPTION OF THE DRAWINGS

FIG. 3 is a table illustrating the luminescence peaks from a secure tag in response to different excitation wavelengths;

FIG. 4 is a graph illustrating excitation intensity versus wavelength for one of the excitation sources (the first excitation source) of FIG. 2;

FIG. 5 is a graph illustrating luminescence intensity versus wavelength from a secure tag in response to the excitation of FIG. 4;

DETAILED DESCRIPTION

Figure 1:
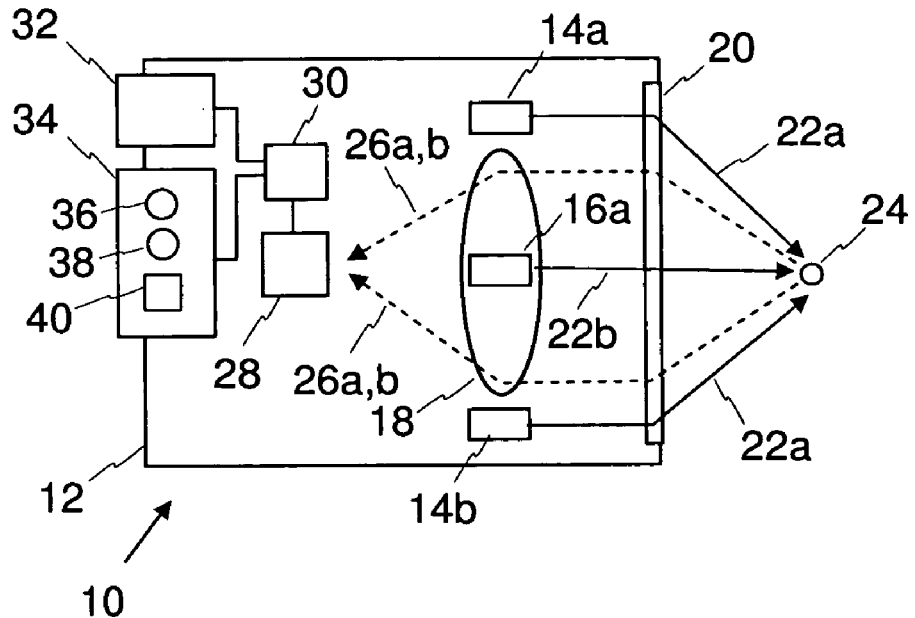
FIG. 1 is a schematic diagram of a secure tag reader according to one embodiment of the present invention.

Reference is first made to FIG. 1, which is a schematic diagram of a secure tag reader 10 according to one embodiment of the present invention.

Figure 2:
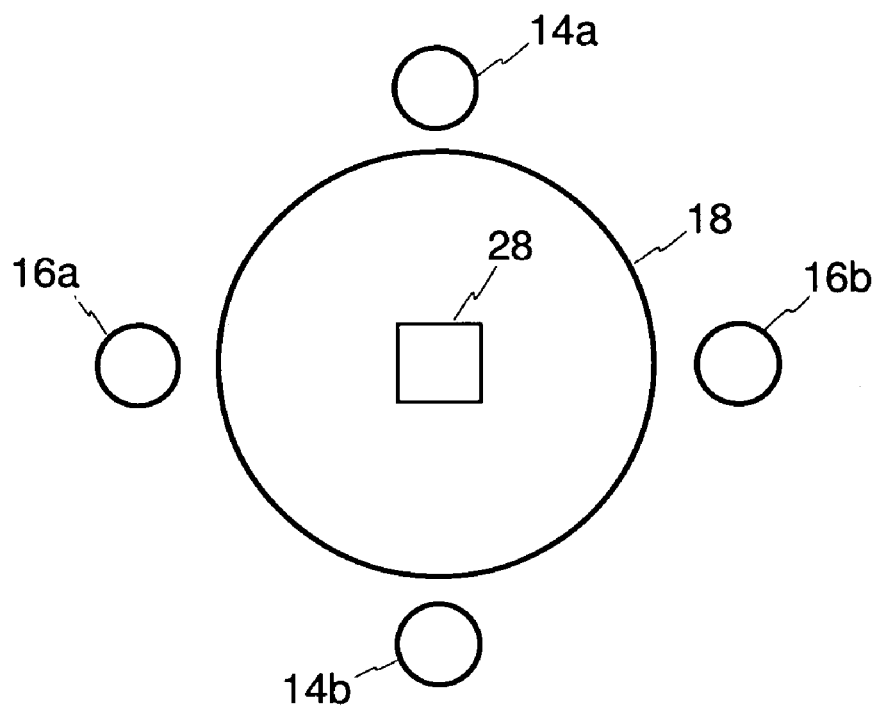
FIG. 2 is a schematic diagram of a part (the collection optics and excitation sources) of the secure tag reader of FIG. 1.

The reader 10 comprises a housing 12 in which two excitation sources 14,16 are mounted. The two excitation sources 14,16 are in the form of two pairs of LEDs circumferentially spaced around a collecting lens 18. FIG. 2, illustrates how each LED in a pair (for example, 12a) is mounted diametrically opposite the other LED in that pair (for example, 12b). A Fresnel lens 20 is mounted at a window in the housing 12 to focus radiation (illustrated by arrows 22a,b) from the excitation sources 14,16 onto a group of secure tags 24. Arrow 22a illustrates radiation emitted from the first excitation source 14, and arrow 22b illustrates radiation emitted from the second excitation source 16.

Luminescence emitted from the secure tags 24 (illustrated by broken arrows 26a,b) is directed by the Fresnel lens 20 onto the collecting lens 18, which in turn focuses the luminescence onto a detector 28, which is an imaging sensor in the form of a CMOS sensor.

It should be appreciated that for clarity and simplicity of explanation, FIG. 1 illustrates luminescence emitted (26a,b) when both the first excitation source 14 and the second excitation source 16 are activated simultaneously. However, in this embodiment, only one excitation source (that is, only one pair of LEDs) is activated at a time. As a result either luminescence 26a resulting from excitation source 14, or luminescence 26b resulting from excitation source 16 is detected, depending on which excitation source 14,16 is energized.

The CMOS sensor 28 is coupled to a processor 30 that receives intensity data from the CMOS sensor 28 and processes this data to identify luminescence peaks, as will be described in more detail below.

The processor 30 can output data, or the results of analysis on the data, via a USB port 32.

The reader 10 also includes a simple user interface 34 controlled by the processor 30. The user interface 34 comprises: a red LED 36, which indicates a failure to authenticate a secure tag 24; a green LED 38, which indicates a successfully authenticated secure tag 24; and a loudspeaker 40, which emits a short beep when a secure tag 24 is successfully authenticated, and a long beep when a secure tag 24 is not successfully authenticated.

In this embodiment, the reader 10 is intended to read secure tags 24 comprising 3 mol% of Europium in borosilicate doped glass, as described in U.S. patent application No. 2005/0143249, entitled,"Security Labels which are Difficult to Counterfeit". As described therein, 3 mol % of Eu-doped borosilicate glass manufactured according to the process and parameters described therein, has the characteristics described in FIG. 3.

The excitation sources 14,16 are selected as follows.

Each of the first pair of LEDs 14a,b is selected to radiate at approximately 535 nm (the first wavelength). As shown in FIG. 4 (which is a graph of intensity (in arbitrary units) versus wavelength), the excitation source 14 produces narrowband radiation 22a, having a peak 50 at 535 nm. The peak 52 of the luminescence 26a (which occurs at 615 nm) stimulated by excitation source 14 is shown in text form in FIG. 3 and in graphical form in FIG. 5 (which is a graph of intensity (in arbitrary units) versus wavelength), and is detected by the CMOS sensor 28 after a short time delay after the first excitation source 14 is de-activated. This peak 52 corresponds to at least one transition.

Narrow peaks (typically having a full width at half maximum (FWHM) of less than 10 nm) may result from a single transition; however, broader peaks (typically having a FWHM of greater than 20 nm) may result from two or more transitions. Peaks having a FWHM of more than 50 nm typically comprise a large number of transitions.

Figure 6:
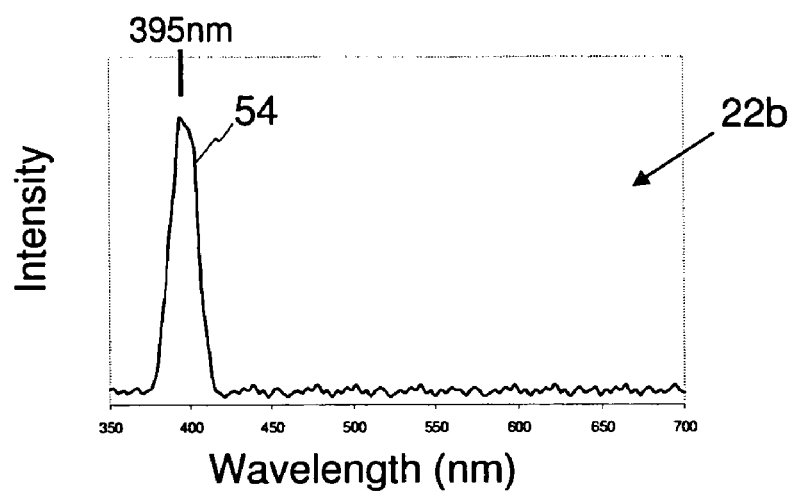
FIG. 6 is a graph illustrating excitation intensity versus wavelength for another of the excitation sources (the second excitation source) of FIG. 2.
Figure 7:
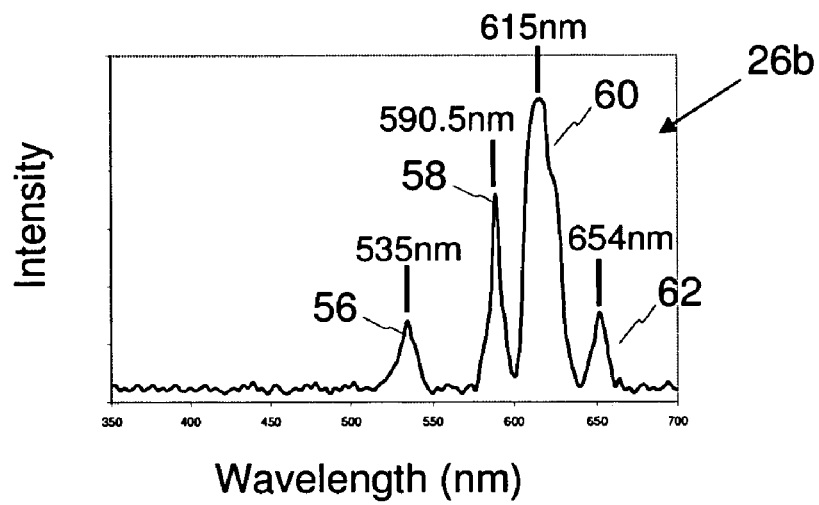
FIG. 7 is a graph illustrating luminescence intensity versus wavelength from a secure tag in response to the excitation of FIG. 6.

Each of the second pair of LEDs 16a,b radiates at a lower wavelength than the first pair of LEDs 14a,b, in this embodiment approximately 395 nm. As shown in FIG. 6 (which is a graph of intensity (in arbitrary units) versus wavelength), the excitation source 16 produces narrowband radiation 22b having a peak 54 at 395 nm. The luminescence 26b stimulated by excitation source 16 produces four peaks 56,58,60,62 as shown in text form in FIG. 3 and in graphical form in FIG. 7 (which is a graph of intensity (in arbitrary units) versus wavelength). The four luminescence peaks occur at 535 nm (peak 56), 590.5 nm (peak 58), 615 nm (peak 60), and 654 nm (peak 62); and are detected by the CMOS sensor 28 a short time delay after the second excitation source 16 is de-activated.

At this point, it should be noted that the peak 52 produced by the first excitation source 14 occurs at the same location as the peak 60 produced by the second excitation source 16; however, the second excitation source also produces peaks 56, 58, and 62, that are not produced by the first excitation source. Thus, an authentication process can be used that detects (i) the peak 52, and the absence of one or more of peaks 56, 58, and 62 after the first excitation source 14 has been activated; and (ii) the peak 60, and the presence of one or more of peaks 56, 58, and 62 after the second excitation source 16 has been activated. The particular peak or peaks selected correspond to the pre-determined wavelength (or pre-determined wavelengths) referred to above. One such authentication process will now be described with reference to FIG. 8.

Figure 8:
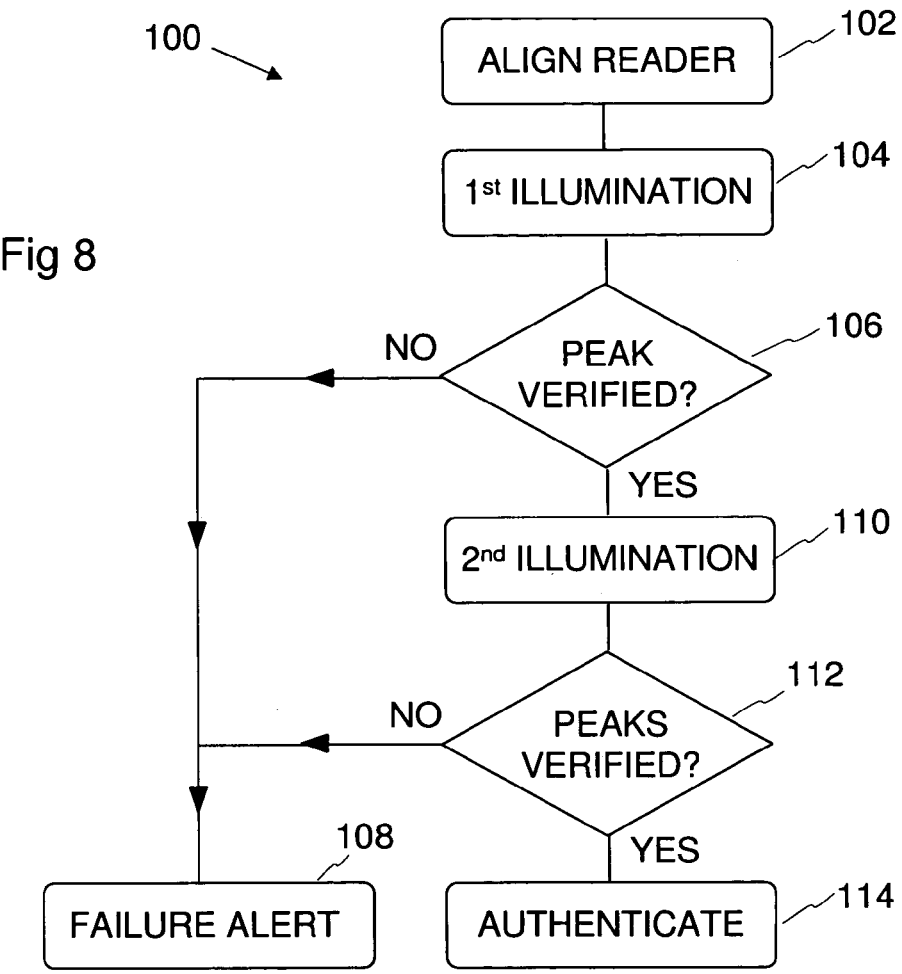
FIG. 8 is a flowchart describing steps involved in authenticating a secure tag using the secure tag reader of FIG. 1.

FIG. 8 is a flowchart describing the steps involved in an authentication process 100 for authenticating one or more secure tags using the secure tag reader 10.

The first step (step 102) is to align the secure tags 24 with the reader 10, either by moving the secure tags (typically by moving an item in which the secure tags 24 are incorporated), or by moving the reader 10, or both. This alignment step (102) may be performed manually, or by the processor 30 if a motorized transport is used. The following steps are performed under control of the processor 30.

The next step (the first illumination step 104) is to illuminate the secure tags 24 using the first excitation source 14 only. The first pair of LEDs 14 are pulsed, and after a short time delay the luminescence 26a from the secure tags 24 is measured by CMOS sensor 28.

The reader 10 then applies a first set of luminescence values from an acceptance criterion to verify (step 106) that a luminescence peak is measured at 615 nm, and background noise levels are measured at 535 nm, 590 nm, and 654 nm (the single peak verification).

If the single peak verification step 106 is not successfully performed then the secure tags 24 are not authenticated and the authentication process proceeds to an authentication failure step (step 108).

At the authentication failure step, the reader 10 alerts a user to the failure to authenticate the secure tags 24 by illuminating the red LED 36 and emitting a long beep from the loudspeaker 40.

If the single peak verification step 106 is successful, then the process 100 proceeds to the second illumination step (step 110). The second illumination step illuminates the secure tags 24 using the second excitation source 16 only. The second pair of LEDs 16 are pulsed, and after a short time delay the luminescence 26b from the secure tags 24 is measured by CMOS sensor 28.

The reader 10 then performs a second verification (step 112) on the secure tags 24 (the multiple peaks verification step). The reader 10 applies a second set of luminescence values from the acceptance criterion to verify that luminescence peaks are measured at 535 nm and 615 nm, and that a background noise level is measured at 550 nm. Measuring a luminescence signal at 550 nm ensures that no peak is present at this wavelength, further ensuring the authenticity of the secure tags 24.

If the multiple peaks verification step 112 is not successfully performed then the secure tags 24 are not authenticated and the authentication process proceeds to the authentication failure step (step 108).

If the multiple peaks verification step 112 is successful, then the process 100 proceeds to an authentication confirmation step (step 114), at which the reader 10 alerts the user to the successful authentication of the secure tags 24 by illuminating the green LED 38 and emitting a short beep from the loudspeaker 40.

It will now be appreciated, that if a fraudster presents a fraudulent tag that includes a broadband response that is filtered to allow only wavelengths at 615 nm plus and minus 5 nm to pass, then although the fraudulent tag may pass the single peak verification step 106, it will not pass the multiple peaks verification step 112, because the response at these additional peaks will be filtered out. If the fraudster presents a fraudulent tag that includes a broadband response that is unfiltered, then the fraudulent tag will fail the single peak verification step 106 because signals appreciably higher than noise level would be measured at 535 nm, 590 nm, and 654 nm.

Various modifications may be made to the above-described embodiments within the scope of the present invention, for example, in other embodiments, different security tags 24 may be used than those described, for example, non-RE particles, or RE particles containing different RE ions, or a different host. In other embodiments, different illumination sources and/or detectors may be used, depending on the luminescence to be stimulated and detected. In other embodiments, the first and second excitation sources may have a common source, and may be tuned to a first excitation wavelength, then a second excitation wavelength. In other embodiments, the wavelengths used for excitation, and the wavelengths detected may be different, depending on the type of secure tag, the dopant ion or ions, the concentration of the dopant, and such like.

Figure 9:
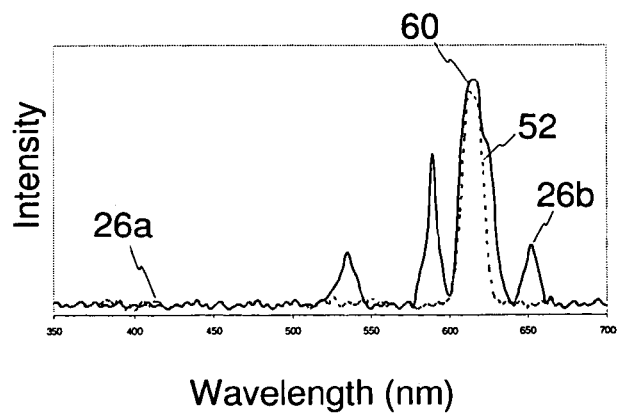
FIG. 9 is a graph showing the luminescence response of FIG. 5 superimposed on the luminescence response of FIG. 7.

In another embodiment, the FWHM may be used to determine if the secure tag 24 is authentic. FIG. 9 shows the luminescence spectrum 26a (in broken line) resulting from excitation by the first excitation source 14 superimposed on the luminescence spectrum 26b (in continuous line) resulting from excitation by the second excitation source 16. As can be seen in FIG. 9, peaks 52 and 60 are aligned, but the FWHM of peak 60 is larger than that of peak 52. This difference in FWHM is due to additional transitions stimulated by the lower wavelength excitation of the second excitation source 16. This difference in FWHM can be used to authenticate the secure tag 24. For example, the FWHM can be measured after excitation by the first excitation source 14, and then measured again after excitation by the second excitation source 16. If the FWHM of the peak 60 is not greater than that of peak 52 then the secure tag 24 will fail authentication.

Figure 10:
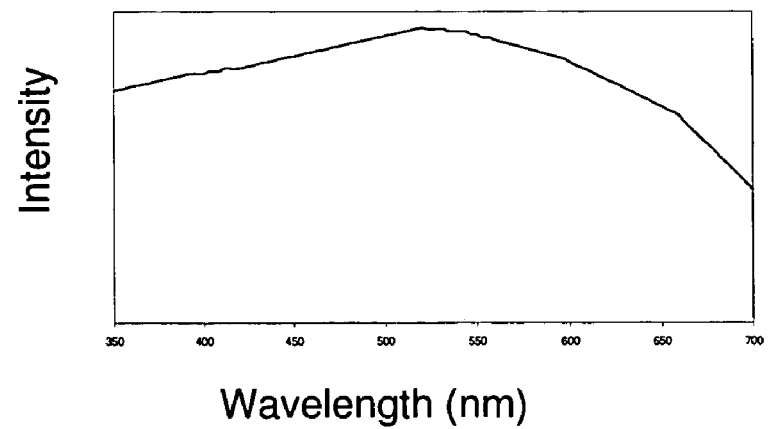
FIG. 10 is a graph illustrating excitation intensity versus wavelength for an alternative second excitation source (a broadband source) for a reader similar to that of FIG. 1.

In other embodiments, a broadband source, such as a white light, may be used as the second excitation source. A typical broadband excitation spectrum is shown in FIG. 10. The luminescence stimulated by a broadband excitation is similar to that resulting from the second excitation source, but the FWHM of the peaks is typically larger, due to an increased number of transitions.

In another embodiment, the first excitation source in the above embodiment is replaced with a pair of LEDs that emit at approximately 940 nm. These LEDs are used to stimulate luminescence based on the Anti-Stokes principle, namely, absorption of two photons for each photon of luminescence that is produced. This means that the effective excitation is at approximately 470 nm (940 nm divided by two); however, in practice, this approximates excitation at 465 nm. Referring to FIG. 3, 465 nm excitation will produce luminescence peaks at 590.5 nm and 615 nm. Since Anti-Stokes is being used, the luminescence at these two peaks will be weaker than for normal excitation at 465 nm; however, additional LEDs may be used (for example two pairs of LEDs or three pairs of LEDs), and/or higher power LEDs may be used, to offset the reduced intensity of luminescence. The authentication process for this embodiment is similar to that described above with reference to FIG. 8; however, the single peak verification step expects peaks at both 590.5 nm and 615 nm, and background noise levels at 535 nm and 654 nm. The multiple peaks verification step may be unchanged, verifying that luminescence peaks are measured at 535 nm and 615 nm, and optionally that a background noise level is measured at 550 nm. Of course, as in the previous embodiment, the multiple peak verification step may verify that all four peaks (535 nm, 590.5 nm, 615 nm, and 654 nm) are present.

In other embodiments, the wavelengths used for the first set of luminescence values and the second set of luminescence values in the acceptance criterion will be different than those detailed above; nevertheless, an acceptance criterion that includes one transition that is present in a luminescence spectrum resulting from one excitation source but not present in a luminescence spectrum resulting from another excitation source is very useful.

It will now be appreciated that the above embodiments enable a reader to excite a secure tag 24 at two or more wavelengths (at different times) to produce different sets of luminescence peaks, and to use this to ensure that a secure tag is not being emulated by suppressing radiation from a counterfeit tag in parts of the electromagnetic spectrum.

In other embodiments, the CMOS sensor 28 may be replaced by a different type of detector, such as a CCD detector, or any other convenient detector such as an avalanche photodiode.

In other embodiments, the reader may perform minimal processing, and may output luminescence signals to an external computer or controller for processing.

What is claimed is:

1. A reader for a secure tag, the reader comprising a first excitation source that stimulates at least one transition; and a second excitation source that stimulates more transitions than the first excitation source; and a detector for detecting luminescence from the secure tag in response to excitation from the first excitation source and in response to excitation from the second excitation source to ensure that luminescence is detected at a pre-determined wavelength in response to the second excitation source but not the first excitation source; and a processor for processing the detected luminescence to determine if an acceptance criterion is fulfilled, wherein the acceptance criterion comprises a first set of luminescence values in response to excitation from the first excitation source, where the first set of luminescence values includes no luminescence being detected at the pre-determined wavelength; and a second set of luminescence values in response to excitation from the second excitation source, where the second set of luminescence values includes luminescence being detected at the pre-determined wavelength.

2. A reader according to claim 1, wherein the first excitation source is selected to stimulate luminescence using an Anti-Stokes shift phenomenon.

3. A reader according to claim 1, wherein the second excitation source comprises a broadband source.

4. A reader according to claim 1, wherein the secure tag comprises dopant ions in a host, and the second excitation source stimulates a plurality of transitions in both the dopant ions and the host; whereas, the first excitation source stimulates one or more transitions in the dopant ions but not in the host.

5. A reader according to claim 1, wherein the luminescence detected at the pre-determined wavelength in response to the second excitation source results from a transition that merges with another transition in a luminescence spectrum to give a broader luminescence peak than the luminescence peak detected in response to radiation from the first excitation source.

6. A reader according to claim 1, wherein the first set of luminescence values includes no luminescence from one wavelength in addition to no luminescence being detected at the pre-determined wavelength.

7. A reader according to claim 6, wherein the second set of luminescence values includes no luminescence from one wavelength, which is different to the pre-determined wavelength.

8. A reader according to claim 1, wherein the reader includes a port for outputting luminescence information to a computer or other processing device.

9. A reader for a secure tag, the reader comprising (i) a first excitation supply that stimulates at least one luminescence peak from the secure tag, (ii) a second excitation supply that stimulates more luminescence peaks from the secure tag than the first excitation supply, (iii) a detector for detecting luminescence from the secure tag in response to excitation from the first excitation supply and in response to excitation from the second excitation supply, and (iv) a processor for processing the detected luminescence to determine if an acceptance criterion is fulfilled, wherein the acceptance criterion comprises no luminescence being detected at a predetermined wavelength in response to excitation from the first excitation supply, and luminescence being detected at the predetermined wavelength in response to excitation from the second excitation supply.

10. A method of authenticating a secure tag comprising: exciting the secure tag at a first wavelength to stimulate a plurality of transitions; detecting luminescence from the secure tag in response to the first wavelength excitation; exciting the secure tag at a second wavelength, lower than the first wavelength, to stimulate more transitions than for the excitation at the first wavelength; detecting luminescence from the secure tag in response to the second wavelength excitation; comparing luminescence at a pre-determined wavelength resulting from the first wavelength excitation with luminescence at the pre-determined wavelength resulting from the second wavelength excitation; authenticating the secure tag in the event that the second wavelength excitation stimulates luminescence at the pre-determined wavelength and the first wavelength excitation does not stimulate luminescence at the pre-determined wavelength.

* * * * *